US011065914B2

(12) United States Patent
Miller

(10) Patent No.: US 11,065,914 B2
(45) Date of Patent: Jul. 20, 2021

(54) RUBBER-COVERED TEXTILE CORDS, TIRES CONTAINING SAME, AND RELATED METHODS

(71) Applicant: Bridgestone Americas Tire Operations, LLC, Nashville, TN (US)

(72) Inventor: Seth M. Miller, Wooster, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 797 days.

(21) Appl. No.: 15/570,447

(22) PCT Filed: Apr. 19, 2016

(86) PCT No.: PCT/US2016/028247
§ 371 (c)(1),
(2) Date: Oct. 30, 2017

(87) PCT Pub. No.: WO2016/176080
PCT Pub. Date: Nov. 3, 2016

(65) Prior Publication Data
US 2018/0147888 A1 May 31, 2018

Related U.S. Application Data

(60) Provisional application No. 62/155,153, filed on Apr. 30, 2015.

(51) Int. Cl.
*B60C 1/00* (2006.01)
*C08K 3/04* (2006.01)
*C08L 7/00* (2006.01)
*B32B 25/10* (2006.01)
*C08K 3/36* (2006.01)
*B60C 9/00* (2006.01)
*B32B 7/12* (2006.01)
*B32B 1/08* (2006.01)
*B32B 5/02* (2006.01)
*C08K 5/54* (2006.01)
*C09D 7/61* (2018.01)
*C09D 107/00* (2006.01)
*D02G 3/48* (2006.01)

(52) U.S. Cl.
CPC .............. *B60C 1/0041* (2013.01); *B32B 1/08* (2013.01); *B32B 5/02* (2013.01); *B32B 7/12* (2013.01); *B32B 25/10* (2013.01); *B60C 1/00* (2013.01); *B60C 9/00* (2013.01); *B60C 9/0042* (2013.01); *C08K 3/04* (2013.01); *C08K 3/36* (2013.01); *C08K 5/54* (2013.01); *C08L 7/00* (2013.01); *C09D 7/61* (2018.01); *C09D 107/00* (2013.01); *D02G 3/48* (2013.01); *B32B 2262/0223* (2013.01); *B32B 2262/0261* (2013.01); *B32B 2262/0269* (2013.01); *B32B 2262/0276* (2013.01); *B32B 2262/04* (2013.01); *B32B 2262/106* (2013.01); *B32B 2264/102* (2013.01); *B32B 2264/108* (2013.01); *B32B 2307/732* (2013.01); *B60C 2001/0066* (2013.01)

(58) Field of Classification Search
CPC ... C08L 7/00; C08L 21/00; C08L 9/00; C09D 107/00; C09D 7/61; B32B 7/12; B32B 25/10; B32B 1/08; B32B 5/02; B32B 2262/04; B32B 2262/0223; B32B 2262/0261; B32B 2262/0276; B32B 2262/0269; B32B 2262/106; B32B 2264/102; B32B 2264/108; B32B 2307/732; B60C 1/00; B60C 2001/0066; B60C 9/0042; B60C 1/0041; D02G 3/48; B29K 2019/00; C09J 121/00; C08J 2321/00; C08J 2309/00; C08J 5/10; C08K 3/04; C08K 3/36; C08K 3/06; C08K 3/22; C08K 5/54; C08K 3/013; C08K 5/548; Y10T 52/1081; B29B 7/7495
USPC ...... 428/375; 156/110, 128.6; 152/527, 564, 152/458, 451, 525; 524/492, 493
See application file for complete search history.

(56) References Cited

U.S. PATENT DOCUMENTS

| | | | |
|---|---|---|---|
| 3,814,160 | A | 6/1974 | Creasey |
| 4,513,123 | A | 4/1985 | Day et al. |
| 5,804,636 | A | 9/1998 | Nahmias et al. |
| 5,948,842 | A | 9/1999 | Araki et al. |
| 5,951,797 | A | 9/1999 | Majumdar et al. |
| 5,955,531 | A | 9/1999 | Futamura |

(Continued)

FOREIGN PATENT DOCUMENTS

| | | |
|---|---|---|
| EP | 0230071 A1 | 7/1987 |
| EP | 1803766 A1 | 7/2007 |

(Continued)

OTHER PUBLICATIONS

PPG Industries, Hi-Sil Reinforcing Silicas, accessed online Jun. 10, 2020.*

(Continued)

Primary Examiner — Camie S Thompson
(74) Attorney, Agent, or Firm — Meredith E. Hooker; Jenny L. Sheaffer

(57) ABSTRACT

The present disclosure is directed to textile cords covered with a rubber composition of specified composition, tires having at least one component comprising the rubber-covered textile cords, and related methods for increasing aged cord coverage of rubber-covered textile cords and for preparing the rubber-covered textile cords. The rubber composition of specified composition includes silica filler in an amount of up to 20 phr and silane coupling agent in an amount of up to 5 phr.

20 Claims, No Drawings

(56) References Cited

U.S. PATENT DOCUMENTS

| | | | |
|---|---|---|---|
| 6,136,913 A | 10/2000 | Nahmias et al. | |
| 6,186,202 B1 | 2/2001 | Majumdar et al. | |
| 6,273,163 B1 | 5/2001 | Materne et al. | |
| 6,306,949 B1 | 10/2001 | Materne et al. | |
| 6,536,492 B2 | 3/2003 | Vasseur | |
| 7,284,583 B2 | 10/2007 | Dheur et al. | |
| 7,470,742 B2 | 12/2008 | Kunisawa | |
| 7,709,564 B2 | 5/2010 | Uchida | |
| 7,799,870 B2 | 9/2010 | Hergenrother et al. | |
| 7,934,528 B2 | 5/2011 | Amaddeo et al. | |
| 8,097,674 B2 | 1/2012 | Hergenrother et al. | |
| 8,148,452 B2 | 4/2012 | Miyazaki | |
| 8,227,538 B2 | 6/2012 | York et al. | |
| 8,304,480 B2 | 11/2012 | Uchida et al. | |
| 8,530,575 B2 | 9/2013 | Miyazaki | |
| 8,794,282 B2 | 8/2014 | Hergenrother et al. | |
| 2004/0182486 A1* | 9/2004 | Bernard | B60C 9/20 152/209.12 |
| 2005/0009955 A1 | 1/2005 | Cohen | |
| 2005/0085582 A1 | 4/2005 | Galimberti et al. | |
| 2005/0103412 A1 | 5/2005 | Zanzig et al. | |
| 2005/0113502 A1 | 5/2005 | Fitzharris Wall et al. | |
| 2006/0102269 A1 | 5/2006 | Uchida et al. | |
| 2006/0137797 A1 | 6/2006 | Galimberti et al. | |
| 2006/0169382 A1* | 8/2006 | Sandstrom | C08K 3/013 152/537 |
| 2006/0174998 A1 | 8/2006 | Takagi et al. | |
| 2006/0254687 A1 | 11/2006 | Sandstrom | |
| 2007/0006953 A1 | 1/2007 | Galimberti et al. | |
| 2007/0149664 A1 | 6/2007 | Kunisawa et al. | |
| 2007/0179247 A1 | 8/2007 | Sandstrom et al. | |
| 2007/0208127 A1 | 9/2007 | Esch et al. | |
| 2007/0272338 A1 | 11/2007 | Galimberti et al. | |
| 2008/0185087 A1 | 8/2008 | Galimberti et al. | |
| 2008/0251174 A1 | 10/2008 | Romani et al. | |
| 2008/0308208 A1 | 12/2008 | Wakabayashi | |
| 2009/0020209 A1 | 1/2009 | Wada et al. | |
| 2009/0044893 A1 | 2/2009 | Mruk et al. | |
| 2009/0056847 A1 | 3/2009 | Romani et al. | |
| 2009/0065117 A1 | 3/2009 | Caprio et al. | |
| 2009/0165915 A1 | 7/2009 | Galimberti et al. | |
| 2009/0194214 A1 | 8/2009 | Galimberti et al. | |
| 2009/0218026 A1 | 9/2009 | Giannini et al. | |
| 2009/0229728 A1 | 9/2009 | Kaneda | |
| 2009/0234066 A1 | 9/2009 | Da Silva et al. | |
| 2009/0250151 A1 | 10/2009 | Galimberti et al. | |
| 2010/0069529 A1 | 3/2010 | Resmini et al. | |
| 2010/0116388 A1 | 5/2010 | Roder et al. | |
| 2010/0175805 A1 | 7/2010 | Wada | |
| 2010/0181002 A1 | 7/2010 | Miyazaki | |
| 2010/0224301 A1 | 9/2010 | Sakamoto et al. | |
| 2011/0071245 A1 | 3/2011 | De-Riva Perez et al. | |
| 2011/0259488 A1 | 10/2011 | Zhao et al. | |
| 2011/0259501 A1 | 10/2011 | Assaad | |
| 2011/0290396 A1 | 12/2011 | Nakagawa et al. | |
| 2011/0315296 A1 | 12/2011 | Cogne et al. | |
| 2012/0090756 A1 | 4/2012 | Le Clerc | |
| 2012/0177944 A1 | 7/2012 | Toyosawa | |
| 2013/0075009 A1 | 3/2013 | Miyazaki | |
| 2013/0133803 A1 | 5/2013 | Sandstrom | |
| 2013/0302606 A1 | 11/2013 | Tahara | |
| 2014/0005320 A1 | 1/2014 | Weingart et al. | |
| 2014/0083588 A1 | 3/2014 | Nahmias Nanni et al. | |
| 2014/0124113 A1 | 5/2014 | Miyazaki et al. | |
| 2014/0206809 A1 | 7/2014 | Miyazaki et al. | |

FOREIGN PATENT DOCUMENTS

| | | |
|---|---|---|
| EP | 1781729 B1 | 7/2008 |
| EP | 2094510 B1 | 10/2010 |
| EP | 2193036 B1 | 9/2011 |
| EP | 2061833 B1 | 9/2013 |
| EP | 2752447 A1 | 7/2014 |
| IN | 2011KO00658 A | 6/2011 |
| JP | H11-315170 A | 11/1999 |
| JP | 2005247985 A | 9/2005 |
| JP | 2010037435 A | 2/2010 |
| JP | 2011037980 A | 2/2011 |
| WO | 2008135061 A1 | 11/2008 |
| WO | 2009071122 A1 | 6/2009 |
| WO | 2009107151 A1 | 9/2009 |
| WO | 2010000294 A1 | 1/2010 |
| WO | 2010000299 A1 | 1/2010 |
| WO | 2010122396 A2 | 10/2010 |
| WO | 2012052328 A1 | 4/2012 |
| WO | 2013083749 A1 | 6/2013 |
| WO | 2013102186 A2 | 7/2013 |
| WO | 2014040639 A1 | 3/2014 |

OTHER PUBLICATIONS

Niedermeier, et al., "Performance Enhancement in Rubber by Modern Filler Systems," KGK Kautschuk Gummi Kunststoffe, vol. 60(4), Apr. 2007, pp. 184-187.

Mededina et al., "Synthetic Layered Silicate as a Carrier for Liquid Ingredients for the Rubber and Tire Industry," Macromolecular Symposia, vol. 247, 2007, pp. 147-155.

Fulton, Stephen W., "Steel Tire Cord-Rubber Adhesion, Including the Contribution of Cobalt," Rubber Chemistry & Technology, vol. 78(3) (Jul./Aug. 2005), pp. 426-457.

Creasey et al., Role of Silicas and Silicates in Rubber Adhesion, Rubber Chemistry & Technology, vol. 41(5), 1968, pp. 1300-1311.

Wagner, M.P., "Fine-Particle Siicas in Tire Treads, Carcass, and Steel-Belt Skim," Rubber Chemistry & Technology, vol. 50(2), 1977, pp. 356-363.

"Penacolite Resin," by INDSPEC Chemical Corporation, downloaded Jul. 14, 2014, 2 pages.

"Penacolite Resin Products," by INDSPEC Chemical Corporation, downloaded Jul. 14, 2014, 3 pages.

International Search Report from PCT application PCT/US2016/028247, dated Jul. 2016.

Written Opinion from from PCT application PCT/US2016/028247, dated Jul. 2016.

Supplemental Search Report and Search Opinion from EP application 16786935.3 dated Jan. 7, 2019.

* cited by examiner

RUBBER-COVERED TEXTILE CORDS, TIRES CONTAINING SAME, AND RELATED METHODS

FIELD

The present application is directed to textile cords covered with a rubber composition of specified composition, tires having at least one component comprising the rubber-covered textile cords, and related methods for increasing aged cord coverage of rubber-covered textile cords and for preparing the rubber-covered textile cords.

BACKGROUND

Textile cords covered with rubber are utilized in various tire components such as plies including body ply, cap ply, and carcass ply. The composition of the rubber used for covering the textile cords may be a relatively complex blend of rubber and other ingredients in which one or more of the other ingredients is a high cost and/or specialized ingredient that may add expense to the cost of formulating the rubber composition. Additionally, when silica filler is utilized in these rubber compositions a significant amount is used, thereby further increasing the overall cost of formulating the rubber composition.

SUMMARY

Disclosed herein are textile cords covered with a rubber composition of specified composition, tires having at least one component comprising the rubber-covered textile cords, and related methods for increasing aged cord coverage of rubber-covered textile cords and for preparing the rubber-covered textile cords.

In a first embodiment, textile cords covered with a rubber composition are disclosed. The rubber composition comprises (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package.

In a second embodiment, a tire comprising at least one component comprising the rubber-covered textile cords according to the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package) is disclosed.

In a third embodiment, a method for increasing the cord coverage of rubber-covered textile cords is disclosed. The method comprises utilizing the textile cords of the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package). According to the method of the third embodiment, the increase in cord coverage is exhibited after aging for 7 days at 75° C. and 95% humidity, 14 days at 75° C. and 95% humidity, or both and as compared to the cord coverage after equivalent aging of textile cords covered with a rubber composition lacking any silane but otherwise identical.

In a fourth embodiment, a method for preparing textile cords according to the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package) is disclosed. The method comprises calendering the textile cords with the rubber composition in the form of one or more sheets, or extruding the rubber composition onto the textile cords.

DETAILED DESCRIPTION

Disclosed herein are textile cords covered with a rubber composition of specified composition, tires having at least one component comprising the rubber-covered textile cords, and related methods for increasing aged cord coverage of rubber-covered textile cords and for preparing the rubber-covered textile cords.

In a first embodiment, textile cords covered with a rubber composition are disclosed. The rubber composition comprises (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package.

In a second embodiment, a tire comprising at least one component comprising the rubber-covered textile cords according to the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package) is disclosed.

In a third embodiment, a method for increasing the cord coverage of rubber-covered textile cords is disclosed. The method comprises utilizing the textile cords of the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package). According to the method of the third embodiment, the increase in cord coverage is exhibited after aging for 7 days at 75° C. and 95% humidity, 14 days at 75° C. and 95% humidity, or both and as compared to the cord coverage after equivalent aging of textile cords covered with a rubber composition lacking any silane but otherwise identical.

In a fourth embodiment, a method for preparing textile cords according to the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package) is disclosed. The method comprises calendering the textile cords with the rubber composition in the form of one or more sheets, or extruding the rubber composition onto the textile cords.

The rubber compositions useful in the first-fourth embodiments disclosed herein differ from previous compositions used to cover textile cords in that they utilize limited amounts of silica (i.e., up to 20 phr) and do not require the use of specialized (and often expensive) ingredients to achieve sufficient cord to rubber adhesion or to achieve sufficient cord coverage. In other words, the rubber compositions useful in the first-fourth embodiments disclosed herein might be described as relatively simple in composition. The capability of such relatively simple rubber compositions to achieve the improvements in aged cord coverage was surprising.

Definitions

The terminology as set forth herein is for description of the embodiments only and should not be construed as limiting the invention as a whole.

As used herein, the term "cord" as used in the phrase "textile cord" means a strand made of textile material. An individual cord may be comprised of multiple filaments each made of textile material.

As used herein, the term "covered" as used in the phrases "textile cords covered with a rubber composition" and "rubber-covered textile cords" is intended to encompass textile cords whose outer surface is almost entirely or entirely enveloped in rubber (i.e., a rubber composition). The textile cords may be arranged into a fabric-like structure, with individual cords running parallel to each other, prior to being covered with rubber. The textile cords (or fabric containing the cords) may be covered with a rubber composition as a result of various processes such as calendering a rubber sheet or sheets over the cords (or fabric containing the cords) or extruding the cords (or fabric containing the cords) with the rubber composition. The rubber sheet used for covering the textile cords may also be referred to as a ply skim. By almost entirely or entirely enveloped is meant that the outer surface of the textile cord (or fabric containing the cords) is at least 97% covered with the rubber composition, preferably a continuous length of at least 16 cm of the textile cord (or a section of fabric of at least 40 cm$^2$) meets the foregoing.

As used herein, the term "majority" means at least 51% by weight.

As used herein, the term "phr" means parts per one hundred parts rubber, with rubber being the at least one conjugated diene monomer-containing polymer or copolymer.

As used herein, the term "ply" such as used in the phrases "body ply," "cap ply," and "carcass ply" refers to a layer of rubber-covered textile cords useful in building a tire. Multiple layers of such material are referred to as plies. The textile cords of the ply are usually arranged into a fabric-like structure with individual cords running parallel to each other, prior to being covered with rubber.

As used herein, the term "textile" as used in the phrase "textile cords" is intended to encompass cords made from natural or synthetic material (or fibers), non-limiting examples of which include PET, PVA, polyester, rayon, aramid, and nylon. For the avoidance of doubt, a metal cord (e.g., steel cord) is not a textile cord; thus, the textile cord may also be described as non-metallic.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified.

Conjugated Diene Monomer-Containing Polymer or Copolymer

As discussed above, according to the first-fourth embodiments disclosed herein the rubber composition comprises at least one conjugated diene monomer-containing polymer or copolymer. By stating that the rubber composition comprises at least one conjugated diene monomer-containing polymer or copolymer is meant that the composition may comprise, one conjugated monomer-containing polymer, more than one conjugated monomer-containing polymer, one conjugated monomer-containing copolymer, more than one conjugated monomer-containing polymer, one conjugated monomer-containing polymer and one conjugated monomer-containing copolymer, one conjugated monomer-containing polymer and more than one conjugated monomer-containing copolymer, or more than one conjugated monomer-containing polymer and one conjugated monomer-containing copolymer. The total amount of at least one conjugated diene monomer-containing polymer or copolymer should be understood as comprising 100 parts and the amounts of other ingredients are specified based upon this 100 parts (i.e., in phr).

The conjugated diene monomer or monomers contained in the at least one polymer or copolymer of the rubber compositions of the first-fourth embodiments disclosed herein may vary. Examples of suitable conjugated diene monomers for use in preparing the at least one polymer or copolymer of the rubber composition of the first-fourth embodiments include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and combinations thereof. It should be understood that mixtures of two or more conjugated diener may be utilized in certain embodiments to prepare the polymer/copolymer. In certain embodiments, the at least one conjugated diene monomer-containing polymer or copolymer further comprises at least one vinyl aromatic monomer. Examples of suitable vinyl aromatic monomers for use in preparing the polymer or copolymer include, but are not limited to, styrene, α-methyl styrene, p-methylstyrene, o-methylstyrene, p-butylstyrene, vinylnaphthalene, p-tertbutylstyrene, vinyl catechol-based, and combinations thereof. In certain embodiments of the first-fourth embodiments disclosed herein, the at least one conjugated diene monomer-containing polymer or copolymer of the rubber composition comprises a combination of 1,3-butadiene monomer and styrene monomer. Non-limiting examples of suitable combinations of monomers for use preparing the at least one polymer or copolymer of the rubber composition include, but are not limited to those which result in the following polymers and copolymers: polybutadiene, styrene-butadiene rubber, styrene-isoprene rubber, styrene-butadiene-isoprene rubber, and polyisoprene.

In certain embodiments of the first-fourth embodiments, the at least one conjugated diene monomer-containing polymer or copolymer of the rubber composition comprises at least one of the following: synthetic polyisoprene rubber, natural rubber, styrene-butadiene rubber (SBR), styrene-isoprene rubber, butadiene-isoprene-rubber, styrene-isoprene-butadiene rubber, acrylonitrile, nitrile rubber, or polybutadiene.

In certain embodiments of the first-fourth embodiments disclosed herein, a majority by weight of the at least one conjugated diene-monomer-containing polymer or copolymer comprises natural rubber. In certain such embodiments, 60-100% by weight, including 60-95% by weight, 60-90% by weight, 60-85% by weight, 60-80% by weight, 65-100% by weight, 65-95% by weight, 65-90% by weight, 65-85% by weight, 70-100% by weight, 70-95% by weight, 70-90% by weight, 70-85% by weight, 75-100% by weight, 75-95% by weight, 75-90% by weight, 75-85% by weight, 80-100% by weight, 80-95% by weight, 80-90% by weight, and 80-85% by weight of the at least one conjugated diene-monomer-containing polymer or copolymer comprises natural rubber. In certain embodiments of the first-fourth embodiment disclosed herein, a majority by weight of the at least one conjugated diene monomer-containing polymer or copolymer comprises a combination of natural rubber and polyisoprene (with any polyisoprene being present in a lesser amount than the natural rubber. In certain such embodiments, 60-100% by weight, including 60-95% by weight, 60-90% by weight, 60-85% by weight, 60-80% by weight, 65-100% by weight, 65-95% by weight, 65-90% by weight, 65-85% by weight, 70-100% by weight, 70-95% by weight, 70-90% by weight, 70-85% by weight, 75-100% by weight, 75-95% by weight, 75-90% by weight, 75-85% by weight, 80-100% by weight, 80-95% by weight, 80-90% by weight, and 80-85% by weight of the at least one conjugated diene-monomer-containing polymer or copolymer comprises a combination of natural rubber and polyisoprene (with any polyisoprene being present in a lesser amount than the natural rubber).

Silica Filler

As discussed above, according to the first-fourth embodiments disclosed herein the rubber composition comprises silica filler in an amount of up to 20 phr. According to the first-fourth embodiments disclosed herein one or more than one silica filler may be utilized, with the total amount of all silica filler(s) being up to 20 phr (i.e., no more than 20 phr). In certain embodiments of the first-fourth embodiments disclosed herein, the rubber composition comprises silica filler in an amount of no more than 15 phr, or no more than 10 phr. In certain embodiments of the first-fourth embodiments disclosed herein, the rubber composition comprises silica filler in an amount of 1-15 phr, 5-15 phr, or 1-10 phr.

Suitable reinforcing silica fillers for use in the rubber compositions according to the first-fourth embodiments disclosed herein are well known. Non-limiting examples of reinforcing silica fillers suitable for use in the rubber compositions of certain embodiments of the first-fourth embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of the first-fourth embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred; such silica fillers are produced by a chemical reaction in water, from which they are precipitated as ultrafine, spherical particles, with primary particles strongly associated into aggregates, which in turn combine less strongly into agglomerates. Surface area, as measured by the BET method, is a preferred measurement for characterizing different silica fillers. In certain embodiments of the first-fourth embodiments disclosed herein, the silica filler of the rubber composition has a surface area (as measured by the BET method) of no more than about 170 $m^2/g$, which should be understood as including no more than 170 $m^2/g$, about 55 to about 170 $m^2/g$, about 100 $m^2/g$ to about 150 $m^2/g$, and 100 $m^2/g$ to 150 $m^2/g$. In certain embodiments of the first-fourth embodiments disclosed herein, the silica filler of the rubber composition has a pH of about 5.5 to about 7 or slightly over 7, preferably about 5.5 to about 6.8. Some of the commercially available reinforcing silica fillers which can be used in the rubber compositions of certain embodiments of the first-fourth embodiments disclosed herein include, but are not limited to, Hi-Sil® 315-D, Hi-Sil® 315-G-D, Hi-Sil® 210, Hi-Sil® 233, Hi-Sil® 243LD, Hi-Sil® 900, Hi-Sil® 135, and the like, produced by PPG Industries (Pittsburgh, Pa.). As well, a number of useful commercial grades of different silica fillers are available from Evonik-Degussa Corporation (e.g., Ultrasil® VN2), Rhone Poulenc, and J. M. Huber Corporation.

Silane Coupling Agent

As discussed above, according to the first-fourth embodiments disclosed herein the rubber composition comprises silane coupling agent in an amount of up to 2 phr. According to the first-fourth embodiments disclosed herein one or more than one silane coupling agent may be utilized, with the total amount of all silane coupling agent(s) being up to 2 phr (i.e., no more than 2 phr).

Generally, any conventional type of silane coupling agent can be used in the rubber compositions of the first-fourth embodiments, such as those having a silane and a constituent component or moiety that can react with a polymer, particularly a vulcanizable polymer. The silane coupling agent acts as a connecting bridge between silica and the polymer. Suitable silane coupling agents for use in the rubber compositions of the first-fourth embodiments include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the first-fourth embodiments, the silane coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silane coupling agent) to be added in one ingredient, which generally tends to make rubber compounding easier. Thus, in certain embodiments of the first-fourth embodiments, the silane coupling agent is provided in a form such that it is present on the surface of the silica (i.e., prior to being added to the rubber composition). In certain embodiments of the first-fourth embodiments where a pre-treated silica is used it may be advantageous to also use some amount of silane coupling agent (e.g., a smaller amount than would be required if the silica were not pre-treated).

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS-R^3-Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^6-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in the rubber compositions of certain exemplary embodiments according to the first-fourth embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in the rubber compositions of certain exemplary embodiments according to the first-fourth embodiments disclosed herein include bis(trialkoxysilylorgano) disulfides and bis(trialkoxysilylorgano)tetrasulfides. Specific non-limiting examples of bis(trialkoxysilylorgano) disulfides suitable for use in the rubber compositions of certain exemplary embodiments according to the first-fourth embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilyl propyl)disulfide, 3,3'-bis(dimethoxyphenylsilyl-2-methylpropyl)disulfide, and mixtures thereof. Non-limiting examples of bis(trialkoxysilylorgano) tetrasulfide silane coupling agents suitable for use in the rubber compositions of certain exemplary embodiments according to the first-fourth embodiments disclosed herein include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in the rubber compositions of certain exemplary embodiments of the first-fourth embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in the rubber compositions of certain exemplary embodiments according to the first-fourth embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in the rubber compositions of certain exemplary embodiments according to the first-fourth embodiments disclosed herein include, but are not limited to, Ciptane® 255 LD, Ciptane® LP, Ciptane® I (PPG Industries) silicas that have been pre-treated with a mercaptosilane; Coupsil® 6109 silica that is the product of the reaction between organosilane Bis(triethoxysilylpropyl) polysulfide (Si69) and Ultrasil® VN2 silica, and Coupsil® 6508 silica (Evonik-Degussa). In those embodiments of the rubber compositions and methods disclosed herein where the silica comprises a pre-treated silica, the pre-treated silica is used in an amount as previously disclosed for the reinforcing silica filler (i.e., no more than 20 phr).

In certain embodiments of the first-fourth embodiments disclosed herein, the silane coupling agent is not only present in an amount of up to phr but also meet the requirement of being present in the rubber composition in an amount of no more than 10% by weight of the amount of silica filler. In certain such embodiments, the silane coupling agent is present in an amount of 1-10% by weight of the amount of silica filler, 2-10% by weight, 3-10% by weight, 5-10% by weight, 1-8% by weight, 2-8% by weight, 3-8% by weight, or 3-5% by weight.

Carbon Black

As discussed above, according to the first-fourth embodiments disclosed herein the rubber composition comprises carbon black filler in an amount up to 40 phr. According to the first-fourth embodiments disclosed herein one or more than one silane coupling agent may be utilized, with the total amount of all carbon black filler being up to 40 phr (i.e., no more than 40 phr). Within the foregoing parameters, the amount of carbon black filler can vary. In certain embodiments of the first-fourth embodiments disclosed herein, the rubber composition comprises 1-40 phr of carbon black filler, 1-30 phr of carbon black filler, 1-20 phr of carbon black filler, 1-10 phr of carbon black filler, 5-40 phr of carbon black filler, 5-30 phr of carbon black filler, 5-20 phr of carbon black filler, or 5-10 phr of carbon black filler. According to certain embodiments of the first-fourth embodiments disclosed herein, one or more than one carbon black may be utilized in the rubber composition.

Generally, suitable carbon black for use in the rubber compositions of certain embodiments of the first-fourth embodiments disclosed herein includes any of the commonly available, commercially-produced carbon blacks, including those having a surface area of at least about 30 $m^2/g$, and, more preferably, at least about 35 $m^2/g$ up to about 95 $m^2/g$ or higher. Surface area values for carbon blacks used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-fourth embodiments disclosed herein, the rubber composition includes a mixture of two or more of the foregoing blacks. Typical suitable carbon blacks for use in certain embodiments of the first-fourth embodiments disclosed herein are N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Cure Package

As discussed above, according to the first-fourth embodiments disclosed herein the rubber composition comprises a cure package. Generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator, and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Methylene Donor and Methylene Acceptor

In certain embodiments of the first-fourth embodiments disclosed herein, the rubber composition comprises (includes) at least one methylene donor and at least one methylene acceptor. In certain such embodiments, the at least methylene donor is present in an amount of 0.1-10 phr, 0.1-8 phr, or 0.1-5 phr and the at least methylene acceptor is present in an amount of 0.1-10 phr, 0.1-8 phr, or 0.1-5 phr. In certain such embodiments, the amount of methylene donor is greater than the amount of methylene acceptor, such as in a ratio of 1.2/1 to 1.8/1.

The term "methylene acceptor" is known to those having skill in such art and is used to describe the reactant(s), or compound(s) with which the methylene donor compound (described below) reacts to form what is believed to be an intermediate methylol monomer. It is envisioned that a condensation of the intermediate methylol monomer by formation of a methylene bridge produces a resin material. The initial reactant for which it is envisioned contributes the moiety that later forms the methylene bridge and ultimately the resin is referred to as the methylene donor and the other reactant is referred to as the methylene acceptor. Examples of suitable methylene acceptors are include, but are not limited to, those disclosed in U.S. Pat. Nos. 6,605,670, 6,472,457, 5,945,500, 5,936,056, 5,688,871, 5,665,799, 5,504,127, 5,405,897, 5,244,725, 5,206,389, 5,194,513, 5,030,692, 4,889,481, 4,605,696, 4,436,853 and 4,092,455, each of which is incorporated herein by reference in its entirety. Generically, examples of suitable methylene acceptor compounds for use in the rubber compositions of certain embodiments of the first-fourth embodiments include, but are not limited to, resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof.

Suitable methylene donors are well-known to those of skill in the art and include those disclosed in the patents listed in the preceding paragraph. Examples of suitable methylene donor compounds include, but are not limited to, hexamethoxymethylmelamine, hexamethylenetetramine, methoxymethyl melamine, N,N'N"-trimethyl N,N'N"-trimethylolmelamine, hexamethylomelamine, N,N'N"-dimethylolmelamine, N-methylolmelamine, N,N'-dimethylolmelamine, N,N'N"-tris(methoxymethyl)melamine, N,N'N"-tributyl-N,N'N"-trimethyloi-melamine, hexaethoxymethylmelamine, and mixtures thereof.

In certain embodiments of the first-fourth embodiment disclosed herein, the rubber composition is prepared by adding the methylene acceptor(s) in a different mixing stage than the methylene donor(s). For instance, the methylene acceptor(s) can be added in a non-productive mixing stage, and the methylene donor can be added in the productive or final mixing stage. In other embodiments of the first-fourth embodiments disclosed herein, the rubber composition is prepared by adding both the methylene acceptor(s) and methylene donor(s) in the productive or final mixing stage.

Other Ingredients

Other ingredients that may be employed in the rubber compositions of certain embodiments of the first-fourth embodiments disclosed herein are well known to those of skill in the art and include oils (processing and extender), waxes, processing aids, antioxidants, tackifying resins, reinforcing resins, peptizers, and one or more additional rubbers. Oils and waxes are referred to collectively herein as plasticizers. In certain embodiments of the first-fourth embodiments disclosed herein, the rubber composition comprises about 1 to about 20 phr or 1 to 20 phr of one or more plasticizers.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXON MOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, *camellia* oil, jojoba oil, macadamia nut oil, coconut oil, and palm oil. The foregoing processing oils can also be used as an extender oil, i.e., to prepare an oil-extended polymer or copolymer. Generally, for most applications the total amount of oil used (processing oil and extender oil) in the rubber compositions and methods disclosed herein ranges about 1 to about 20 phr or 1 to 20 phr.

Miscellaneous Non-Preferred Ingredients

As discussed above, the rubber compositions used to cover the textile cords according to the first-fourth embodiments disclosed herein can be described as relatively simple in composition by which is meant that they achieve an improvement in pull-out force, an improvement in cord coverage, an improvement in aged cord coverage, or a combination of the foregoing without the use of certain high cost and/or specialized ingredients that may be difficult to obtain and add expense to the cost of formulating the rubber composition. More specifically, in certain embodiments of the first-fourth embodiment, the rubber composition used to cover the textile cords meets at least one of the following: (a) contains less than 5 phr of liquid rubber, less than 1 phr of liquid rubber, or is free of liquid rubber; (b) contains less than 10 phr of epoxidized natural rubber, less than 5 phr of epoxidized rubber, less than 1 phr of epoxidized rubber, or is free of epoxidized rubber; (c) contains less than 0.5 of cobalt-containing compounds, less than 0.1 phr of cobalt or is free of any cobalt compound; (d) contains less than 5 phr of coal pitch-based carbon fibers, less than 1 phr of coal pitch-based carbon fibers, or is free of coal pitch-based carbon fibers; € contains 10 phr or less of zinc oxide; (f) contains less than 0.1 phr of di-substituted or tri-substituted benzene compounds having at least one hydroxyl group (such as disclosed in U.S. Patent Application Publication No. 2009/0229728), or is free of di-substituted or tri-substituted benzene compounds having at least one hydroxyl group (such as disclosed in U.S. Patent Application Publication No. 2009/0229728); (g) contains less than 0.5 parts of a 1,3-bis(citraconimidomethyl) compound (such as disclosed in U.S. Patent Application Publication No. 2010/0175805), contains less than 0.1 parts of a 1,3-bis(citraconimidomethyl) compound (such as disclosed in U.S. Patent Application Publication No. 2010/0175805), or is free of 1,3-bis(citraconimidomethyl) compound (such as disclosed in U.S. Patent Application Publication No. 2010/0175805); (h) contains less than 0.01 phr of oxetane compounds (such as disclosed in PCT Application Publication WO 2010/000299), or is free of oxetane compounds (such as disclosed in PCT Application Publication WO 2010/000299); (i) contains less than 30 phr of functionalized polymer or copolymer (i.e., the at least one conjugated diene monomer-containing polymer or copolymer contains less than 30 phr of functionalized polymer or copolymer); or (j) contains less than 2 phr of layered inorganic materials including clay, less than 1 phr of layered inorganic materials including clay, or is free of layered inorganic materials including clay.

Textile Cords

As discussed above, the first-fourth embodiments disclosed herein relate to textile cords covered with a rubber composition (alternatively described as rubber-covered textile cords). In certain embodiments, the textile cords covered with a rubber composition constitute (comprise) a ply, useful for or utilized as a component of tires. Thus, certain embodiments of the first embodiment disclosed herein can be understood as relating to a ply (e.g., a body ply, a cap ply, or a carcass ply) comprising textile cords covered with a rubber composition, the rubber composition as specified above for the first embodiment. In certain embodiments of the first-fourth embodiments disclosed herein, the textile cords comprise at least one of PET (polyethylene terephthalate), PEN (polyethylene naphthalate), PVA (polyvinyl alcohol), polyester, rayon, aramid, or nylon. By stating that the textile cords (in certain embodiments) comprise at least one of the specified materials, it is meant that the textile cords may comprise one of the specified materials or a combination of two or more of the specified materials. In certain embodiments of the first-fourth embodiments disclosed herein, the textile cords comprise PET. In certain embodiments of the first-fourth embodiments disclosed herein, the textile cords are non-metallic.

In certain embodiments of the first-fourth embodiments disclosed herein, the textile cords comprise (contain) an adhesive treatment between their outer surface and the rubber composition covering. Various adhesive treatments for improving the adhesion between textile cords and rubber used to cover the cords are known to those of skill in the art and are suitable for use in certain embodiments of the first-fourth embodiments disclosed herein. Non-limiting examples of suitable adhesive treatment for the textile cords include the use of resorcinol/formaldehyde resin/latex (RFL) which is frequently applied by dipping into an aqueous solution containing the RFL where the rubber component comprises a styrene-butadiene copolymer latex, a vinylpyridine-styrene-butadiene terpolymer latex, a blocked isocyanate-containing solution, polyvinylpyrrolidone, or a combination thereof; a solution (e.g., water-based, alcohol-based, acetone-based) containing epoxide resin(s) (optionally in combination with a precondensate resin); a polyepoxide pre-treatment prior to any latex treatment; and combinations thereof. With respect to the RFL adhesive treatment, the resorcinol component reacts with the formaldehyde component to produce a resorcinol-formaldehyde reaction product. The reaction product is the result of a condensation reaction between a phenol group on the resorcinol and the aldehyde group on the formaldehyde.

Suitable epoxide resins for use in preparing adhesive treatments are known to those of skill in the art and generally have an average of more than one epoxy group per molecule, with an average of about 200 to about 2500 grams/mole and an epoxide equivalent weight of about 100 to about 500. By the term "epoxide equivalent weight" is meant the weight in grams of resin which contains 1 gram equivalent of epoxy groups. Suitable epoxide resins include those prepared by the reacting of haloepoxides with polyhydric alcohols, polyhydric phenols, and polybasic heterocyclic acids. For example, the reaction of epichlorohydrin with glycerol yields mixtures of mono-, di-, and tri-glycidyl ethers of glycerol.

Resins useful in mixtures with epoxide resins according to this invention include any fusible, soluble condensates of an aldehyde with a phenol, and an amine such as urea, and/or melamine. These fusible and soluble condensates may be referred to as precondensates. The aldehydes used in preparing such precondensates may be aliphatic, cycloaliphatic, or aromatic monoaldehydes, e.g., acetaldehyde, cyclohexanal, and benzaldehyde. Formaldehyde and materials which engender formaldehyde (e.g., paraformaldehyde) may be used. Suitable phenols for condensation with aldehydes include any mono- or poly-nuclear and mono- or polyhydric phenols (e.g., phenol and resorcinol). The preparation of fusible precondensates generally includes formation in aqueous solution followed by direct mixing with an epoxide resin for application to the textile cord. Examples of commercially available precondensates are Penacolite® resins (condensate of resorcinol and formaldehyde available from Indespec Chemical Corporation, Pittsburgh, Pa.), Arofene® resin (formaldehyde/phenol resins available from Ashland Chemical Company, Covington, Ky.), and Cymel® resins (hexamethoxymethylmelamine made from formaldehyde and melamine available from Allnex, Brussels, Belgium). In place of commercially available preformed condensates, one can mix formalin (37% by weight formaldehyde in water) and resorcinol in water and add ammonia to create an aqueous precondensate. Alternatively, one can adjust the resorcinol/formaldehyde (R/F) ratio in commercially available precondensates by addition of formalin to the epoxide/precondensate solution.

Preparation of the Rubber Composition

The rubber composition that is used in the rubber-covered textile cords (alternatively described as textile cords covered with a rubber composition) of the first-fourth embodiments, is generally prepared according to conventional methods. Also disclosed herein are methods for preparing rubber compositions. In certain embodiments of the first-fourth embodiments disclosed herein, the rubber composition is formed by mixing together the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first-fourth embodiments disclosed herein, the rubber composition is prepared by a process comprising more than one non-productive master-batch mixing stage.

Generally, the at least one conjugated diene monomer-containing polymer or copolymer, silica filler, silane coupling agent, and carbon black filler will be added in a non-productive or master-batch mixing stage or stages. Generally, at least the vulcanizing agent component and the vulcanizing accelerator component of the cure package will be added in a final or productive mixing stage.

In certain embodiments of the first-fourth embodiments disclosed herein, the rubber composition is prepared using non-productive master batch mixing stage(s) conducted at a temperature of about 130° C. to about 200° C. In certain embodiments of the first-fourth embodiments disclosed herein, the rubber composition is prepared using a final productive mixing stage conducted at a temperature below the vulcanization temperature in order to avoid unwanted pre-cure of the rubber composition. Therefore, the temperature of the productive or final mixing stage should not exceed about 120° C. and is typically about 40° C. to about 120° C., or about 60° C. to about 110° C. and, especially, about 75° C. to about 100° C. In certain embodiments of the first-fourth embodiments disclosed herein, the rubber composition is prepared according to a method that includes at least one non-productive mixing stage and at least one productive mixing stage.

Tires

As discussed above, according to the second embodiment, a tire comprising at least one component comprising the rubber-covered textile cords according to the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package) is disclosed.

In certain embodiments of the second embodiment, the at least one component comprises a ply, more specifically a radially inner ply; in certain such embodiments the at least one component comprises a body ply, a cap ply, or a carcass ply. By radially inner is meant radially inner of the road-contacting tread. A body ply is positioned radially inward in the tire and comprises a layer comprising rubber-covered textile cords. Generally, a tire comprises a pair of annular beads and the body ply is wrapped circumferentially around the tire and extends from bead to bead, in certain embodiments extending around the beads. In certain embodiments, the tire comprises an inner liner and the body ply is positioned radially outward of the inner liner; in certain such embodiments the body ply is adjacent to the inner liner with no intervening layer(s) between and in other such embodiments the body ply is separated from the inner liner by one or more intervening layers. In certain instances the body ply is termed a carcass ply. A carcass ply is positioned radially inward in the tire and also comprises a layer comprising rubber-covered textile cords; in certain tires one or more carcass plies are utilized and are positioned such that they extend from bead to bead in the tire with their respective cords positioned radially or diagonally (i.e., not circumferentially). When more than one carcass ply is utilized, each may be positioned such that their cord direction differs (e.g., biased to each other). A cap ply is positioned radially inward in the tire and also comprises a layer comprising rubber-covered textile cords. Generally, a tire comprises at least one belt ply positioned radially outward of a body ply and the cap ply is radially outward and circumferentially over all of a portion of the axial width of the belt ply or plies.

Increasing Aged Cord Coverage

As discussed above, the third embodiment disclosed herein is directed to a method for increasing the aged cord coverage of rubber-covered textile cords. The method comprises utilizing the textile cords of the first embodiment (i.e., textile cords covered with a rubber composition comprising (a) at least one conjugated diene monomer-containing polymer or copolymer; (b) silica filler in an amount of up to 20 phr; (c) silane coupling agent in an amount of up to 2 phr; (d) carbon black filler in an amount of up to 40 phr; and (e) a cure package). According to the method of the third embodiment, the increase in cord coverage is exhibited after aging for 7 days at 75° C. and 95% humidity, 14 days at 75° C. and 95% humidity, or both and as compared to the cord coverage after equivalent aging of textile cords covered with a rubber composition lacking any silane but otherwise identical. In certain embodiments of the third embodiment, the improvement in aged cord coverage comprises an improvement of at least 1%, at least 2%, at least 3%, at least 4%, at least 5%, at least 6%, at least 7%, at least 8%, at least 9%, at least 10%, or more after aging for 7 days at 75° C. and 95% humidity, 14 days at 75° C. and 95% humidity, or both, and is relative to the aged cord coverage exhibited by cords subjected to equivalent aging but covered with a rubber composition lacking any silane coupling agent (but otherwise identical in composition). The improvement (increase) in aged cord coverage of rubber-covered textile cords can be measured using the guidance of various methods including ASTM D4776/D4776M-10 (Standard Test Method for Adhesion of Tire Cords and Other Reinforcing Cords to Rubber Compounds by H-Test Procedure) to prepare the rubber-covered textile cords, followed by aging (as described above), and a visual inspection test to determine the relative percentage of coverage. The measurement of an increase in aged cord coverage according to the invention of the present disclosure should be determined relative to textile cords covered in rubber that has an identical composition other than lacking any silane coupling agent; the comparative rubber-covered textile cords should also be prepared according to the same procedure (e.g., ASTM D4776/D4776M-10) as the rubber-covered textile cords according to the present disclosure.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments.

In Examples 1-6, rubber compositions were prepared using the ingredients specified in Table 1. Example 1 is a control or comparative example which lacks any silane coupling agent. The amount of each ingredient (other than the rubbers which themselves total 100 parts) used is listed in Table 1 in parts per hundred rubber (phr). The rubber compositions were prepared in a two stage mixing process (i.e., one master-batch/non-productive stage, followed by a final batch stage) according to the conditions shown in Table 2.

TABLE 1

| Ingredient | Ex. 1 | Ex. 2 | Ex. 3 | Ex. 4 | Ex. 5 | Ex. 6 |
|---|---|---|---|---|---|---|
| Master-Batch | | | | | | |
| Natural rubber | 85 | 85 | 85 | 85 | 85 | 85 |
| Styrene-butadiene rubber | 15 | 15 | 15 | 15 | 15 | 15 |
| Carbon Black (N550 grade) | 30 | 30 | 30 | 30 | 30 | 30 |
| Silica | 10 | 10 | 10 | 10 | 10 | 10 |
| Silane coupling agent | 0 | 0.3 | 0.5 | 1 | 1.5 | 2 |
| Zinc Oxide | 3.5 | 3.5 | 3.5 | 3.5 | 3.5 | 3.5 |
| Softener | 7 | 7 | 7 | 7 | 7 | 7 |
| Phenol-Formaldehyde Resin (methylene acceptor) | 0.9 | 0.9 | 0.9 | 0.9 | 0.9 | 0.9 |
| Final Batch | | | | | | |
| Sulfur | 2.2 | 2.2 | 2.2 | 2.2 | 2.2 | 2.2 |
| HMMM (methylene donor) | 1.55 | 1.55 | 1.55 | 1.55 | 1.55 | 1.55 |
| Accelerators | 1.55 | 1.55 | 1.55 | 1.55 | 1.55 | 1.55 |

TABLE 2

| Mixing Parameters | | |
|---|---|---|
| Stage | Time | Condition |
| Master-Batch Stage 1 (initial temp: 105° C., rotor rpm started at 60) | 0 seconds 30 seconds | Charge polymers Charge any oil, filler (e.g., any carbon black and/or silica) and other master-batch ingredients, increase rotor to 60 rpm Drop based on max temperature of 320° F. (160° C.) |
| Final Batch Stage (initial temp: 80° C., rotor rpm at 40) | 0 seconds 0 seconds | Charge Master-batch 1 Charge curatives (i.e., sulfur and accelerators) and HMMM. Drop based on max temperature of 210° F. (99° C.) |

After curing, each of the rubber compositions was tested for tensile properties. The results of testing of the formulations of Examples 1-6 are shown in Table 3, below. The abbreviation Eb is used for elongation at break and Tb for stress at break, which measurements provide an indication of a rubber composition's (uncured) mechanical strength. The abbreviation M300 is used for tensile stress at 300% elongation. The abbreviation G' is used for shear modulus, which provides a measure of the viscosity of the rubber composition, with lower values preferred. The tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in Table 3 (below) as engineering-stresses by reference to the original cross-sectional area of the test piece. The specimens were tested at 23° C. Samples had been cured for 40 minutes at 150° C., and then tensile properties were analyzed.

The index values listed in Table 4 were determined by comparing the value for the formulation according to the present disclosure with the respective value for the control (i.e., dividing the test value by the control value).

TABLE 3

| | Ex. 1 | Ex. 2 | Ex. 3 | Ex. 4 | Ex. 5 | Ex. 6 |
|---|---|---|---|---|---|---|
| G' (dNm) | 67 | 64 | 67 | 64 | 64 | 65 |
| M300 (MPa) | 8.7 | 9 | 8.9 | 9.4 | 9.8 | 9.9 |
| Eb 23° C. (%) | 518 | 497 | 545 | 523 | 529 | 500 |
| Tb (MPa) | 19 | 18.4 | 20.5 | 20.5 | 21 | 19.9 |

Uncured samples of each of the rubber compositions of Examples 1-6 were formed into rubber sheets of approximately 0.7 mm thickness. Thereafter, a sample of PET cord was added to a mold and rubber sheets placed on both sides of the textile cord. Pressure is then applied to the assembled sample to remove trapped air. Thereafter, the rubber-coated cords were cured for 20 minutes at 160° C.

Two types of measurements were made on the rubber-covered PET cords: pull-out force and percent coverage. Each measurement was conducted on a sample that had been subjected to humidity aging (75° C. and 95% relative humidity) for 7 days, and for 14 days. The pull-out force measurements were following the guidance of ASTM D-2229 and the cord was pulled out from each sample and the covering state of the rubber over the cord was visually observed and the coverage was determined as a value between 0 to 100% as an adhesion indicator, which was then converted to an indexed value. Results appear in Table 4.

TABLE 4

| | Ex. 1 | Ex. 2 | Ex. 3 | Ex. 4 | Ex. 5 | Ex. 6 |
|---|---|---|---|---|---|---|
| 7 D Pull Out Index | 100 | 105 | 111 | 99 | 74 | 97 |
| 14 D Pull Out Index | 100 | 109 | 86 | 103 | 75 | 89 |
| 7 D Coverage Index | 100 | 110 | 111 | 106 | 135 | 112 |
| 14 D Coverage Index | 100 | 107 | 111 | 111 | 125 | 100 |

As can be seen from the data of Table 4, the rubber-covered cords utilizing rubber compositions according to the present disclosure (i.e., of Examples 2-6) exhibited improved (increased) aged cord coverage after aging for 7 days at 75° C. and 95% relative humidity and after aging for 14 days at 75° C. and 95% relative humidity, as compared to the rubber-covered cords that utilized the control rubber composition (i.e., of Ex. 1) which lacked any silane coupling agent. As to pull-out force, the rubber-covered cords that utilized the rubber composition of Example 2 exhibited the best overall aged pull-out force after aging at both 7 days and 14 days. However, the rubber-covered cords that utilized the rubber composition of Example 3 exhibited an improvement in aged pull-out force after aging at 7 days and the cords that utilized the rubber composition of Example 4 exhibited comparable pull-out force after aging at 7 days and improved pull-out force after aging at 14 days. The indexed values appearing in Table 4 were prepared using Example 1 as a control (e.g., dividing the value for Example 2 by the respective value for Example 1 and multiplying by 100); indexed values greater than 100 represent an improvement.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. Textile cords covered with a rubber composition, the rubber composition comprising:
   a. at least one conjugated diene monomer-containing polymer or copolymer;
   b. silica filler in an amount of up to 20 phr;
   c. silane coupling agent in an amount of up to 2 phr and wherein the amount of silane coupling agent comprises no more than 10% by weight of the amount of silica filler;
   d. carbon black filler in an amount of up to 40 phr; and
   e. a cure package,
   wherein the total amount of silica filler and carbon black is no more than 50 phr, and wherein the rubber composition contains less than 0.5 phr of cobalt-containing compounds.

2. The textile cords of claim 1, wherein the textile cords covered with a rubber composition meets at least one of the following:
   f. exhibits an unaged pull out force of at least 20 N/cord
   g. exhibits a pull out force of at least 15 N/cord after aging for 7 days at 75° C., 95% humidity; or
   h. exhibits improved cord coverage after aging for 7 days at 75° C. and 95% humidity, 14 days at 75° C. and 95% humidity, or both as compared to the cord coverage after equivalent aging of textile cords covered with a rubber composition lacking any silane but otherwise identical.

3. The textile cords of claim 1, wherein the silica filler has a BET surface area of no more than about 170 m$^2$/g.

4. The textile cords of claim 1, comprising 5-15 phr of silica filler.

5. The textile cords of claim 1, wherein the silane coupling agent is provided in a form that is present on the surface of the silica filler.

6. The textile cords of claim 1, wherein the amount of silane coupling agent comprises 1-8% by weight of the amount of silica filler.

7. The textile cords of claim 1, wherein a majority by weight of the at least one conjugated diene monomer-containing polymer or copolymer comprises natural rubber.

8. The textile cords of claim 1, wherein the cord comprises at least one of polyethylene terephthalate, polyethylene naphthalate, polyvinyl alcohol, polyester, rayon, aramid, or nylon.

9. The textile cords of claim 1, wherein the rubber composition meets at least one of the following:
   i. less than 5 phr of liquid rubber;
   j. less than 10 phr of epoxidized natural rubber;
   k. less than 0.1 phr of cobalt-containing compounds;
   l. less than 5 phr carbon fibers;
   m. less than 10 phr of zinc oxide;
   n. less than 0.1 phr of di-substituted or tri-substituted benzene compounds having at least one hydroxyl group;
   o. less than 0.5 phr of a 1,3-bis(citraconimidomethyl) compound;
   p. less than 0.01 phr of oxetane compounds;
   q. less than 30 phr of the at least one conjugated diene monomer-containing polymer or copolymer comprises a functionalized polymer or copolymer; or
   r. less than 2 phr of layered inorganic materials including clay.

10. The textile cords of claim 1, wherein the rubber composition comprises no more than 15 phr of silica filler.

11. The textile cords of claim 1, wherein the rubber composition is calendared onto the cords.

12. The textile cords of claim 1, wherein the textile cords further comprise an adhesive treatment between their outer surface and the rubber composition covering.

13. A tire comprising at least one component comprising the rubber-covered textile cords of claim 1.

14. A tire comprising at least one component comprising textile cords covered with a rubber composition, the rubber composition comprising:
   s. at least one conjugated diene monomer-containing polymer or copolymer;
   t. silica filler in an amount of up to 20 phr;
   u. silane coupling agent in an amount of up to 2 phr and wherein the amount of silane coupling agent comprises no more than 10% by weight of the amount of silica filler;
   v. carbon black filler in an amount of up to 40 phr; and
   w. a cure package,
and wherein the rubber composition contains less than 0.5 phr of cobalt-containing compounds.

15. The tire of claim 14, wherein the component comprises a body ply, a cap ply, or a carcass ply.

16. The tire of claim 15, wherein the textile cords covered with a rubber composition meet at least one of the following:
   x. exhibits an unaged pull out force of at least 20 N/cord
   y. exhibits a pull out force of at least 15 N/cord after aging for 7 days at 75° C., 95% humidity; or
   z. exhibits improved cord coverage after aging for 7 days at 75° C. and 95% humidity, 14 days at 75° C. and 95% humidity, or both as compared to the cord coverage after equivalent aging of textile cords covered with a rubber composition lacking any silane but otherwise identical.

17. The tire of claim 14, wherein the total amount of silica filler and carbon black is no more than 50 phr.

18. A method for increasing the aged cord coverage of rubber-covered textile cords, the method comprising utilizing textile cords covered with a rubber composition, the rubber composition comprising:
   aa. at least one conjugated diene monomer-containing polymer or copolymer;
   bb. silica filler in an amount of up to 20 phr;
   cc. silane coupling agent in an amount of up to 2 phr and wherein the amount of silane coupling agent comprises no more than 10% by weight of the amount of silica filler;
   dd. carbon black filler in an amount of up to 40 phr; and
   ee. a cure package,
wherein the rubber composition contains less than 0.5 phr of cobalt-containing compounds, and
wherein the increase is exhibited after aging for 7 days at 75° C. and 95% humidity, 14 days at 75° C. and 95% humidity, or both and as compared to the cord coverage after equivalent aging of textile cords covered with a rubber composition lacking any silane but otherwise identical.

19. The method of claim 18, wherein the amount of silane coupling agent comprises 1-8% by weight of the amount of silica filler.

20. The method of claim 18, wherein a majority by weight of the at least one conjugated diene monomer-containing polymer or copolymer comprises natural rubber.

* * * * *